United States Patent
Geisel

[11] Patent Number: 5,644,227
[45] Date of Patent: Jul. 1, 1997

[54] DISPLACEMENT TRANSDUCER TO IDENTIFY THE POSITION OF A PRESSING PLUNGER

[75] Inventor: Gerhard Geisel, Bückeburg, Germany

[73] Assignee: The Firm Hermann Heye, Obernkirchen, Germany

[21] Appl. No.: 379,607

[22] PCT Filed: Mar. 19, 1994

[86] PCT No.: PCT/EP94/00866

§ 371 Date: Jul. 31, 1995

§ 102(e) Date: Jul. 31, 1995

[87] PCT Pub. No.: WO94/27922

PCT Pub. Date: Dec. 8, 1994

[30] Foreign Application Priority Data

May 27, 1993 [DE] Germany ............... 43 17 730.1

[51] Int. Cl.$^6$ ............... G01B 7/04; G01B 7/02; C03B 23/13
[52] U.S. Cl. ............... 324/207.24; 324/207.15; 65/160
[58] Field of Search ............... 324/207.15, 207.16, 324/207.17, 207.11, 207.24, 207.22, 207.25; 65/158, 160

[56] References Cited

U.S. PATENT DOCUMENTS

| | | | |
|---|---|---|---|
| 3,020,527 | 2/1962 | MacLaren | 324/207.24 |
| 3,654,549 | 4/1972 | Maurer et al. | 324/207.16 |
| 5,139,559 | 8/1992 | Kozora . | |
| 5,233,293 | 8/1993 | Huang et al. | 324/207.24 X |
| 5,279,163 | 1/1994 | D'Antonio et al. | 73/728 |

FOREIGN PATENT DOCUMENTS

| | | |
|---|---|---|
| 0488136 | 6/1992 | European Pat. Off. . |
| 3109930 | 9/1982 | Germany . |
| 3401465 | 1/1985 | Germany . |
| 4031931 | 4/1992 | Germany . |

Primary Examiner—Sandra L. O'Shea
Assistant Examiner—Roger C. Phillips
Attorney, Agent, or Firm—Synnestvedt & Lechner

[57] ABSTRACT

A piston rod (2) of a piston-cylinder unit (3) carries at the top a pressing plunger (not shown) of a glass forming machine and is guided in a guide sleeve (22). The guide sleeve (22) is seated in a magnetically conductive support sleeve (20) of a retaining flange (14). The support sleeve (20) carries an external coil (27) whose connecting wires (30) are guided outwardly to a plug socket (37). On the top of the piston (6) is fixed an internal flange (39) of a circular annular metallic actuating member (40). At the uppermost end of the pressing stroke of the piston (6) the actuating member (40) enters into an annular chamber (29) around the coil (27) and thereby changes the inductance of the coil.

23 Claims, 2 Drawing Sheets

DISPLACEMENT TRANSDUCER TO IDENTIFY THE POSITION OF A PRESSING PLUNGER

This is a §371 of PCT/EP94/00866 filed Mar. 19, 1994.

BACKGROUND OF THE INVENTION

The invention relates to a displacement transducer for identifying the axial position of a pressing plunger of a glass forming machine. The pressing plunger is mounted on a piston rod of a piston-cylinder unit for pressing a gob of molten glass into a parison mold. The transducer includes an annular coil fixed relative to the cylinder and a metallic actuating member mounted on the piston. Moving with the piston, the actuating member cooperates with the annular coil to change the inductance of the coil in dependence upon the axial relative position of the piston and of the cylinder. The coil is arranged in the region of one end of the cylinder and encircles the piston rod. The piston rod extends through this end of the cylinder and is guided by guide sleeves. The actuating member is annular and arranged on the side of the piston facing the pressing plunger. Connected to the coil, an electrical evaluation circuit identifies the axial position of the pressing plunger.

In one known displacement transducer of this type (DE 34 01 465 C1) the coil 19 is arranged coaxially with respect to the piston rod 4 between the guide sleeve 25 and the piston 7. The actuating member 27 is fixed on the side of the piston facing the coil 19 and concentrically in relation to the piston rod 4, and protrudes into the coil 19. This structure requires a comparatively large axial amount of room. Consequently, on the one hand the axial displacement detection zone is limited and on the other hand a subsequent incorporation of the displacement transducer into existing piston-cylinder units is in many cases not possible. The cyclical temperature changes which arise by virtue of the process can lead to the coil coming apart from its support. The manufacture of the annular holder 18 with the coil 19 is very complex and expensive.

From DE 40 31 931 A1 there is known an inductive length-measuring sensor 1 which serves to improve the linearity of or to increase the stroke of a differential transformer 15, 35, 36 which has an electronic evaluation circuit connected to the secondary winding 35, 36. The stationary primary winding 15 is located at the center longitudinally, and on the outside of a tubular inner part 12 of a stationary ferromagnetic short-circuit device 11, whose outer part 13 is formed as a thin-walled tube in a bore 5 of a base member 2 made of brass. The inner part 12 is supported on a tubular carrier 6 which is fixed in a bore 4 of the base member 2. Between the parts 12, 13 there is an annular air gap 24 in which a tubular collar 25 of a cup-shaped coil carrier 26 protrudes. On the outside of the coil carrier 26 are embedded part-windings 35, 36 of the secondary winding, axially spaced from one another, so that the part-windings 35, 36 are each located, in an axial mid-position of the coil carrier 26, at the same axial spacing from the stationary primary winding 15. A base 27 of the coil carrier 26 is fixed to a concentric sensing rod 28 which extends through the tubular carrier 6 and is radially guided beyond the ends of the carrier 6 by bearing sleeves 39, 41. Connecting wires 17 serve for the connection of the stationary primary winding 15 to an ac voltage source. Connecting wires 37 to the two part-windings 35, 36 of the displaceable secondary winding lead to an electronic evaluation circuit with a high-resistance input and a phase-sensitive rectifier device.

From DE 31 09 930 A1 is known a displacement transducer for hydraulic elements, such as piston 7 and cylinder 8, which are subject to temperature variations. The object is to reduce zero-point drift. An electrically non-conducting rod core 1 is fixed relative to the cylinder 8, carries a single-layer cylinder coil 4 fed with high frequency alternating current through leads 5, 6 and extends through the piston 7 over the full piston stroke into an internal chamber of the piston rod 2. Piston 7 and piston rod 2 are sheathed in the region of the rod core 1 and its coil 4 with a diamagnetic sleeve 3 which is a good electrical conductor, preferably of brass or copper.

It is the object of the invention to broaden the range of application of the displacement transducer, to increase its life and to make possible a greater distance over which the position of the piston can be identified, with the same dimensions of the overall mechanism, as well as to make it possible to manufacture the product at a more favorable cost.

SUMMARY OF THE INVENTION

These objects are achieved by the features of the present invention. The present invention provides a displacement transducer for identifying the axial position of a pressing plunger of a glass forming machine. Broadly, the invention includes a piston cylinder unit having a piston rod upon which the pressing plunger is mounted, a cylinder, a piston fixed to the piston rod and which is displaceable in the cylinder, and a guide sleeve for guiding the piston rod. The transducer has an annular coil fixed relative to the cylinder and an annular metallic actuating member mounted on the side of the piston which faces the pressing plunger. Moving with the piston, the actuating member cooperates with the annular coil to change the inductance of the coil in dependence upon the axial relative position of the piston and cylinder. A means is provided for connecting the coil to an electrical evaluation circuit.

The coil is arranged in the region of one end of the cylinder, encircling the piston rod, with the cylinder end having said piston rod extending therethrough. The annular coil encircles at least a part of the axial length of the guide sleeve, and the actuating member at least partially encompasses the coil at the end of a pressing stroke of the piston.

In particular, use is made of a pneumatic piston-cylinder unit. The coil and the actuating member are preferably annular in shape. It is sufficient as a rule only to detect the last part of the pressing stroke of the piston by the displacement transducer, for example up to 45 mm. The coil is fed by an ac source which supplies an impressed alternating current. Between the connecting leads of the coil is an alternating voltage which depends upon the magnitude of the inductance of the coil. This inductance is dependent upon the number of windings and upon the magnetic conductivity of the iron core as well as on the length of the magnetic field lines in the space outside the iron and the coil. If the magnetic field lines which extend in the air space outside the coil with its iron core are guided by a magnetically conductive actuating member so that the remaining air route is reduced, then consequently the inductance of this arrangement increases. This expresses itself by an increase in the electrical voltage at the connecting leads. Since the actuating member is mounted on the piston, with the aid of the electrical voltage, the axial position of the piston and consequently of the piston rod and of the pressing plunger can be determined by an electrical voltage signal of high reproducibility. Upon pressing a glass gob in a parison mold of the glass forming machine, the piston typically moves into a middle region of the measuring stroke when the parison mold has been filled to the correct degree. Thus, in each working stroke of the pressing plunger its maximum penetration depth into the mold tool can be detected. By virtue of the substantially concentric arrangement of coil and guide sleeve encased one within the other, important axial space is saved. Consequently, the range of applicability of the displacement transducer is considerably increased, since the total axial length of the pressing plunger unit is not alterable. The arrangement of the coil radially outside the guide sleeve leads to a better mounting of the coil on its support.

Arranging the guide sleeve in a support sleeve fixed relative to the cylinder and fixing the coil externally on the support sleeve results in a particularly compact and operationally favorable construction. The guide sleeve can be replaceably mounted in the support sleeve. A constant reliable connection between the coil and the support sleeve is favored by this construction.

Further functional advantages are obtained where the end of the support sleeve remote from the piston is fixed to a retaining flange and the retaining flange is releasably connected to the cylinder. The unit can be exchanged quickly and with minimal cost when necessary. If the support sleeve and retaining flange consist of magnetically conductive material, this results in a particularly reliable functioning of the displacement transducer. The support sleeve and the retaining flange can be made integral or in a number of pieces.

A spacer ring arranged between the cylinder and the retaining flange makes possible, when necessary, a matching to different axial lengths of the pressing plunger mechanism. The spacer ring facilitates the mounting and the fixing of the coil on the support sleeve. Moreover, the spacer ring can take over centering functions of the adjacent structural components and be employed for the creation of the magnetic field lines in the annular space between the coil and the spacer ring. If the spacer ring and the actuating member consists of magnetically conductive material, the effect of the actuating member upon its displacement into the annular space is small in relation to a large change in voltage, since the sum of all the field line lengths in the annular chamber is small.

If, in contrast, the internal surface of the spacer ring which faces the coil is provided with an electrically conductive layer, where the spacer ring itself can consist of diamagnetic electrically conductive material, the sum of the field line lengths in the annular chamber is greater. Correspondingly, the voltage change is then considerably greater upon displacement of the actuating member into the annular chamber. The electrically conductive layer can consist for example of copper or aluminum and can be of considerably smaller thickness, since only small currents are flowing.

Further advantages are provided by a fiberglass mat arranged between the coil and the support sleeve, and the coil and the fiberglass mat are fixed to each other by a synthetic resin and the fiberglass mat is fixed to the support sleeve by a synthetic resin. A suitable synthetic resin, for example an epoxy resin, with a suitable hardener, can be used, with the components being brought together for their reaction under pressure and increased temperature. The synthetic resin and the fiberglass mat form an electrical insulation of the coil relative to the support sleeve. The synthetic resin penetrates through the fiberglass mat and the coil and after it has hardened produces a coil which is stable in shape with a fixed connection to the support sleeve. High temperature differences of up to 130° C. no longer result in loosening of the coil from its support. A further fiberglass mat fixed by the synthetic resin to the outside of the coil is likewise wetted through by synthetic resin and is compressed with it. This forms a stable outer bandage which makes the coil resistant to external influences.

Where the connecting means for the coil, starting from the coil, are guided first substantially radially outwardly in a first passage in the retaining flange and then in a second passage substantially parallel to a longitudinal axis of the piston-cylinder unit downwards to a plug socket, the plug socket is particularly well protected against contamination and yet is easily accessible from the outside. The plug socket can be arranged in any case at a position which is favorable for handling, for example on an underside of an external flange of the cylinder or even lower. Where the second passage and the plug socket are provided in a lower extension of the retaining flange, the contacting with a connecting cable axially parallel to the piston-cylinder unit is effected, which results in a favorable, compact structure which is at least substantially free from the for radial play. The further feature of a tubular lower extension is particularly favorable from a structural point of view. The extension can be screwed into a threaded bore in the retaining flange for example and, upon assembly, can be guided through aligned receiving bores or longitudinal grooves in the spacer ring and in the external flange of the cylinder. Thus, the plug socket always achieves a favorable axial end position for handling.

Another feature of the invention is where the actuating member is releasably held relative to the piston by means of an internal flange and the internal flange contacts an elastic cover layer of the piston. Here, there is a damping when the piston rod, which in the normal glass forming process is not displaced, is fully extended and the internal flange comes into contact with an abutment surface.

The internal flange can be sunk into the piston at least over a part of its axial extent. By means of this feature the extent for the positional determination of the piston can again be increased substantially.

In another feature, the annular actuating member is magnetically conductive and is provided with a plurality of longitudinal slots spaced around the periphery. This leads to a particularly low-loss influence of the annular chamber through the magnetically conductive actuating member. Because of this, the formation of eddy currents is limited. The slots prevent the flow of the electrical current in the circumferential direction of the actuating member.

If the spacer ring is made of a paramagnetic material which is not a particularly good electrical conductor, for example of cast iron, then upon displacement of an actuating member composed of a diamagnetic, electronically conductive material by means of the coil the sum of all the magnetic field lines is increased. This leads to a reduction the inductance of the arrangement and consequently of the voltage at the connecting leads to the coil. This effect can also be employed in the determination of the piston position, but necessitates however a comparatively precise winding arrangement of the coil.

Further features and advantages of the invention will become apparent from the following description of a number of preferred embodiments in accordance with the invention which are given by way of example and with reference to the drawings.

DETAILED DESCRIPTION

Figure 1:
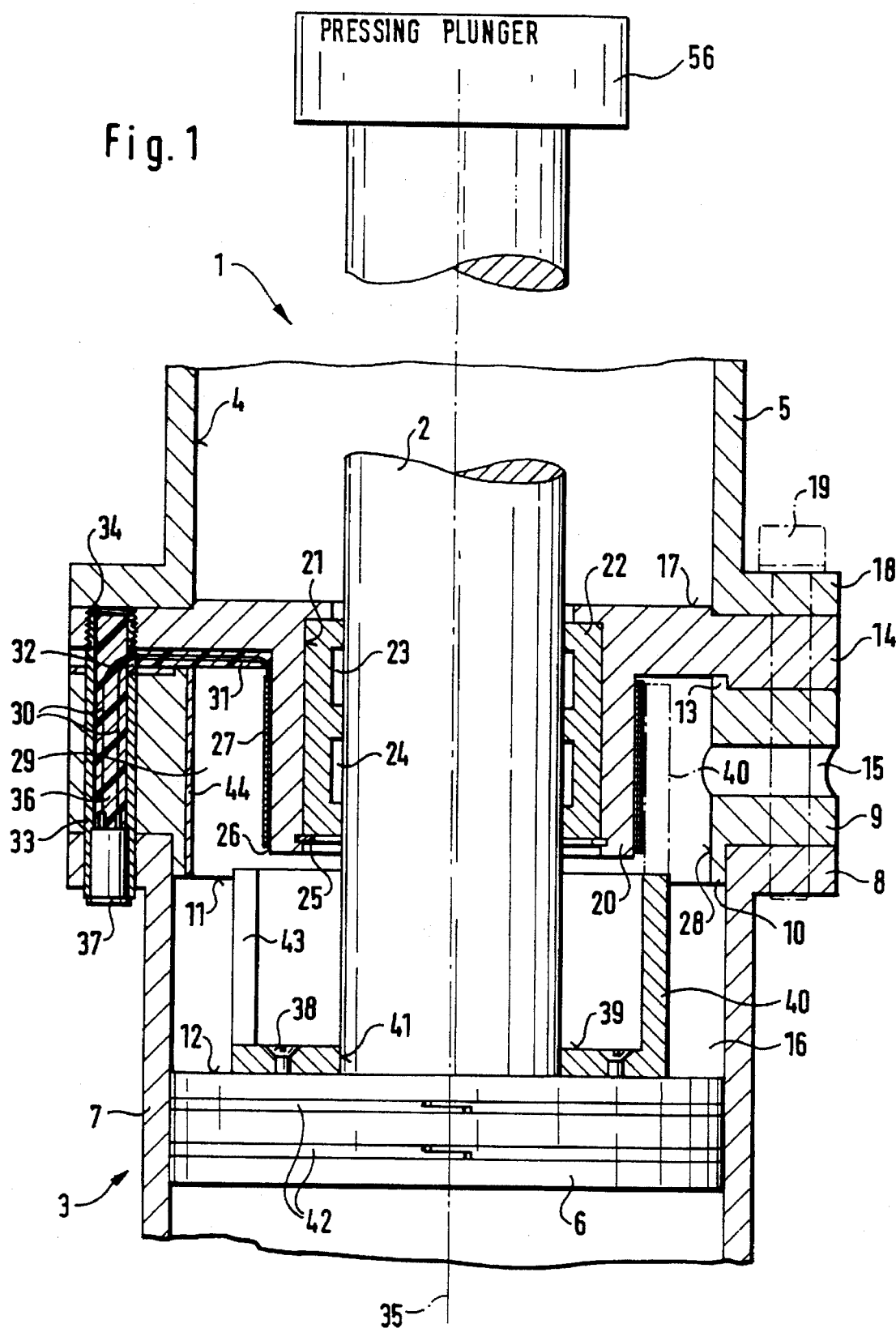
FIG. 1 is a longitudinal sectional view through a displacement transducer, together with associated components of a pressing plunger mechanism.

FIG. 1 shows a part of a pressing plunger mechanism 1 of a glass forming machine which is not shown in any more detail.

Into a parison mold (not shown) of the glass forming machine there is first introduced a gob of molten glass, into which a pressing plunger (as is well known in the art and represented by rectangular box 56) is subsequently introduced from below, with the pressing plunger being fixed at the top of a piston rod 2 of a pneumatic piston-cylinder unit 3. The pressing plunger is guided in the radial direction in a manner which is likewise not shown by an internal surface 4 of an upper part 5 which is designed as a guide cylinder. The piston rod 2 is fixed to a piston 6 of the piston-cylinder unit 3 which is displaceable, in a cylinder 7 under the action of a pressurized medium, preferably compressed air. The piston 6 is sealed off from the cylinder 7 by piston rings 42. The piston-cylinder unit 3 is a double-acting unit.

A spacer ring 9, made for example of cast iron or VA-steel, is supported by an external flange 8 of the cylinder 7 and is centered by means of a lower collar 10. A bottom stop surface 11 of the collar 10 defines a displacement limit for an upper annular surface 12 of the piston 6. Normally, there is no contact between the upper annular surface 12 and the bottom stop surface 11, because the pressing plunger is prevented by the glass gob located in the parison mold from undergoing full movement, having already executed its maximum pressing stroke. This contact can only take place if there is either too little or even no glass material in the parison mold. Customarily, the pressing plunger, depending upon the degree of filling of the parison mold with glass, terminates its pressing stroke a greater or lesser distance in advance of its maximum pressing stroke.

The spacer ring 9 carries and centers by means of an upper collar 13 a retaining flange 14 made of the piston for example of cast iron. The spacer ring 9 is also provided with a connection 15 on the piston rod side of the piston for the supply and discharge of air into and from an upper cylinder chamber 16.

The retaining flange 14 carries and centers by means of an upper collar 17 an external flange 18 of the upper guide part 5.

Bolts 19 are screwed into threaded bores spaced around the periphery of the external flange 8. One such bolt is indicated in the drawing by a chain-dotted line which is peripherally offset. Each bolt 19 extends through holes in the external flange 18, the retaining flange 14 and the spacer ring 9. When the bolts 19 are tightened securely a centered and tightly fastened unit from the cylinder 7 to the upper guide part 5 is created.

A circular annular support sleeve 20 extends from the retaining flange 14 downwards into the cylinder chamber 16. The support sleeve 20 has on the inside a receiving bore 21 for a guide sleeve 22 which guides the piston rod 2 in the radial direction. The guide sleeve 22 is provided on the inside with annular grooves 23 and 24 which, in dependence upon the material of the guide sleeve 22, are either left open in the manner of a labyrinth seal or alternatively carry sealing rings. The guide sleeve 22 is held in the receiving bore 21 by a securing ring 25.

The support sleeve 20 is made integral with the retaining flange 14, made for example of cast iron, and is magnetically conductive. A coil 27 which is preferably stabilized by a plastics resin, for example an epoxy resin, is fixed on to an external surface 26 of the support sleeve 20. The securement can be effected by the use of adhesive for example. An annular chamber 29 is left between the coil 27 and an internal surface 28 of the spacer ring 9.

Means for connecting the coil 27 to an electrical evaluation circuit is provided. Connecting wires 30 for the coil 27 are led out radially first of all from the coil 27 in a first channel 31 through the retaining flange 14. The connecting wires 30 then pass through a window 32 in a tubular downward extension 33 of the retaining flange 14. This extension has previously been screwed into a threaded bore 34 of the retaining flange 14 and extends parallel to a longitudinal axis 35 of the piston-cylinder unit 3. The extension 33 defines a second passage 36 in which the connecting wires 30 are guided from the window 32 downwards until they reach a plug socket 37. Filler material in the passages 31 and 36 seals off the upper cylinder chamber 16 from the outside and fixes the connecting wires 30 for the coil 27. The plug socket 37 is accessible from below and therefore is both easily reached and also protected against contamination.

An internal flange 39 of a circular annular actuating member 40 is releasably fastened and thereby held by screws 38 to the upper annular surface 12 of the piston 6. The internal flange 39 has a central bore 41 which is in contact with the piston rod 2 and which is centered by the latter. This feature facilitates the mounting of the actuating member.

The actuating member 40 is dimensioned such that in the last part of the pressing stroke it penetrates to a greater or lesser extent into the annular chamber 29 and thus alters the inductance of the coil 27. The maximum depth of penetration of the actuating member 40 into the annular chamber 29 is indicated in the drawing on the right-hand side by chain-dotted lines. In this position the upper annular surface 12 of the piston 6 is in contact with the bottom stop surface 11 of the spacer ring 9. If the actuating member 40 is of paramagnetic material, then the inductance of the coil 27 will be at its highest. If on the other hand the actuating member 40 is of diamagnetic material, although electrically conductive, then the inductance of the coil 27 will be at its lowest.

The actuating member 40 can be provided with a plurality of longitudinal slots 43, for example each 1 mm wide, spaced around the circumference, and of which only one is shown in FIG. 1 of the drawings on the left-hand side. The longitudinal slots limit the formation of eddy currents in an advantageous way.

In FIG. 1 a special embodiment of the spacer ring 9 is shown on the left-hand side. There, an electrically conductive layer 44 in the form of an aluminum sleeve is connected to the internal surface 28 of the spacer ring.

Figure 2:
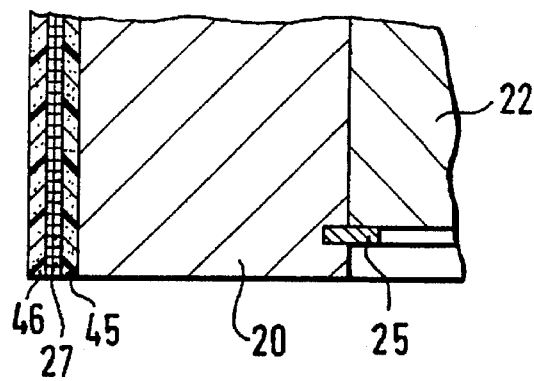
FIG. 2 is a view, on an enlarged scale, of a detail from FIG. 1.

FIG. 2 shows one possibility of designing the coil 27 so that it is stable in shape and can be fixed securely to the outside of the support sleeve 20. For this purpose, a fiberglass mat 45 is arranged between the coil 27 and the support sleeve 20. Also, the outside of the coil 27 is overlaid with a further fiberglass mat 46. The fiberglass mats 45, 46 and the coil 27 are fixedly connected to one another and the fiberglass mat 45 is in addition fixed to the outside of the support sleeve 20 by a synthetic resin, for example an epoxy resin. The epoxy resin and an associated hardener are brought together under increased temperature and pressure in order to react together and are hardened in the desired shape of the coil 27 and of the fiberglass mats 45, 46 relative to the support sleeve 20. This results in a coil body which is stable as to its shape and is mounted fixedly on the outside of the support sleeve 20. This mounting is not disturbed by the cyclical temperature changes which take place during the operation of the glass forming machine and by the particularly high temperature differences occurring during the starting up of the glass forming machine.

Figure 3:
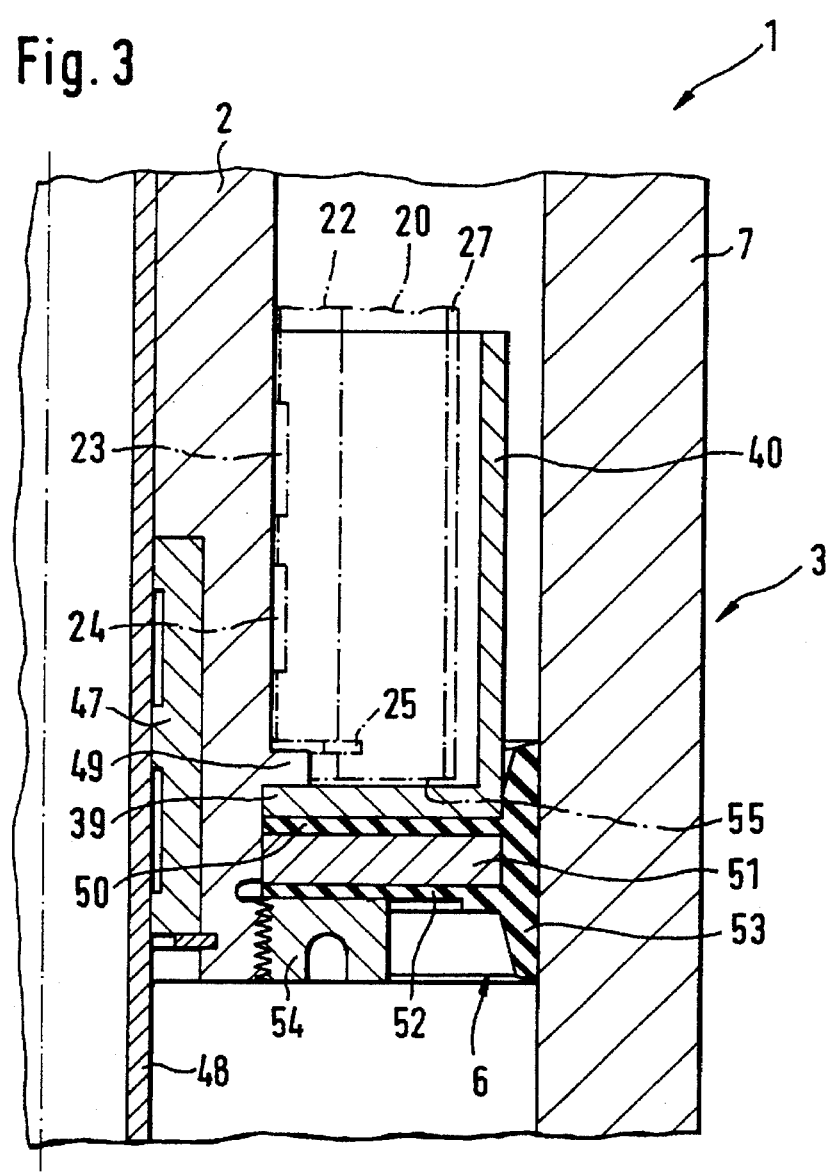
FIG. 3 is a longitudinal sectional view through another embodiment of displacement transducer.

FIG. 3 shows a further embodiment of pressing plunger mechanism 1 in which the same parts as already described above in the earlier embodiments are provided with the respective same reference numerals.

The piston rod 2 is tubular and carries on its inside a guide sleeve 47 which slides on a central stationary air tube 48.

The internal flange 39 of the circular annular actuating member 40 lies upwardly against an external flange 49 of the piston rod 2 and downwardly against a resilient cover layer 50 on an annular core 51 of the piston 6. The core 51 is displaceably guided on the inside by the piston rod and at its underside is also provided with a resilient cover layer 52. The cover layers 50, 52 are integral with a sealing sleeve 53 which is between the core 51 and the cylinder 7.

The cover layers 50, 52, the core 51 and the internal flange 39 are held tightly in place against the external flange 49 by an annular nut 54. As is indicated in FIG. 3 by chain-dotted lines, in this embodiment the support sleeve 20 defines a lower abutment surface 55 for the internal flange 39. By means of this there is a displacement limit for the piston 6 in the upward direction. If there is contact between the internal flange 39 and the abutment surface 55, the shock is damped by the elastic cover layers 50 and 52. In this way the life of the piston-cylinder unit 3 is lengthened.

A further advantage can be seen from FIG. 3, in that the internal flange 39 and the lowest part of the actuating member 40 are sunk in the piston 6. Because of this, length in the axial direction within which a determination of the position of the piston can be effected is gained.

I claim:

1. An apparatus for identifying the axial position of a pressing plunger of a glass forming machine, comprising:
    a piston-cylinder unit having a piston rod upon which the pressing plunger is mounted, a cylinder, a piston fixed to said piston rod and which is displaceable in said cylinder, and a guide sleeve for guiding said piston rod;
    a transducer having an annular coil fixed relative to said cylinder and an annular metallic actuating member mounted on a side of said piston which faces the pressing plunger, said actuating member cooperating with said annular coil wherein the inductance of said coil changes in dependence upon the axial relative position of said piston and said cylinder;
    a means for connecting said coil to an electrical evaluation circuit;
    wherein said coil is arranged in the region of one end of said cylinder, encircling said piston rod, with said cylinder end having said piston rod extending therethrough, and
    wherein said annular coil encircles at least a part of the axial length of said guide sleeve, and said actuating member at least partially encompasses said coil at the end of a pressing stroke of said piston.

2. An apparatus according to claim 1 wherein said guide sleeve is arranged in a support sleeve fixed relative to said cylinder, and said coil is fixed externally on said support sleeve.

3. An apparatus according to claim 2 wherein an end of the support sleeve remote from the piston is fixed to a retaining flange, and the retaining flange is releasably connected to the cylinder.

4. An apparatus according to claim 3 wherein the support sleeve and the retaining flange are of magnetically conductive material.

5. An apparatus according to claim 3 further comprising a spacer ring arranged between the cylinder and the retaining flange.

6. An apparatus according to claim 5 wherein the spacer ring is of magnetically conductive material.

7. An apparatus according to claim 5 wherein an internal surface of the spacer ring which faces the coil is provided with an electrically conductive layer.

8. An apparatus according to claim 5 wherein the piston-cylinder unit is double-acting, and a connection for the supply of pressurized medium is provided in the spacer ring on the piston rod side of the piston.

9. An apparatus according to claim 2 further comprising a fiberglass mat arranged between the coil and the support sleeve, the coil and the fiberglass mat being fixed to each other by a synthetic resin and the fiberglass mat being fixed to the support sleeve by a synthetic resin.

10. An apparatus according to claim 9 further comprising a further fiberglass mat fixed by the synthetic resin to the outside of the coil.

11. An apparatus according to claim 3 wherein the connecting means for the coil, starting from the coil, are guided first substantially radially outwardly in a first passage in the retaining flange and then in a second passage substantially parallel to a longitudinal axis of the piston-cylinder unit downwards to a plug socket.

12. An apparatus according to claim 11 wherein the second passage and the plug socket are provided in a lower extension of the retaining flange.

13. An apparatus according to claim 12 wherein the lower extension is tubular.

14. An apparatus according to claim 1 wherein the actuating member is releasably held relative to the piston by means of an internal flange.

15. An apparatus according to claim 14 wherein the internal flange has a central bore whose periphery contacts the piston rod and is centered thereby.

16. An apparatus according to claim 14 wherein the internal flange contacts an elastic cover layer of the piston.

17. An apparatus according to claim 14 wherein the internal flange is sunk into the piston at least over a part of its axial extent.

18. An apparatus according to claim 1 wherein the annular actuating member is magnetically conductive and is provided with a plurality of longitudinal slots spaced around the periphery.

19. An apparatus according to claim 1 wherein the annular actuating member is of a diamagnetic, electrically conductive material.

20. An apparatus according to claim 6 wherein an internal surface of the spacer ring which faces the coil is provided with an electrically conductive layer.

21. An apparatus according to claim 15 wherein the internal flange contacts an elastic cover layer of the piston.

22. An apparatus according to claim 4 wherein the annular actuating member is of a diamagnetic, electrically conductive material.

23. An apparatus for identifying the axial position of a pressing plunger of a glass forming machine, comprising:
    a piston-cylinder unit comprising a cylinder, a piston displaceable in said cylinder to move through a pressing stroke, a piston rod fixed to said piston and upon which the pressing plunger is mountable, and a guide sleeve for guiding said piston rod;

a transducer comprising an annular coil fixed relative to said cylinder and an annular actuating member mounted on a side of said piston which faces the pressing plunger, wherein the inductance of said coil is responsive to the axial position of said piston relative to said cylinder;

an electrical connector for connecting said coil to an electrical evaluation circuit;

wherein said coil is arranged in the region of one end of said cylinder, encircling said piston rod, with said piston rod extending through said coil; and wherein said coil encircles at least a part of the axial length of said guide sleeve, and said actuating member encompasses at least part of said coil when said piston is at the end of the pressing stroke.

* * * * *